US005369780A

United States Patent [19]

Jung

[11] Patent Number: 5,369,780

[45] Date of Patent: Nov. 29, 1994

[54] AMPLIFYING AND PHASE SHIFTING VERTICAL AND HORIZONTAL POLARIZED SIGNALS FOR FREQUENCY CONVERTING SATELLITE BROADCAST RECEPTIONS

[75] Inventor: Jae R. Jung, Seoul, Rep. of Korea

[73] Assignee: Goldstar Co., Ltd., Rep. of Korea

[21] Appl. No.: 975,415

[22] Filed: Nov. 12, 1992

[30] Foreign Application Priority Data

Nov. 11, 1991 [KR] Rep. of Korea ............... 19971/1991

[51] Int. Cl.[5] ........................ H01P 1/165; H04B 7/185

[52] U.S. Cl. .................................. 455/12.1; 455/131; 455/323; 333/21 A

[58] Field of Search ............... 455/313, 323, 327, 328, 455/319, 293, 280, 289, 137, 131, 20, 12.1, 13.2, 13.3; 333/21 A; 343/700 MS, 756, 762, 772, 778, 786; 342/361, 383, 384, 382, 380, 153

[56] References Cited

U.S. PATENT DOCUMENTS

| | | | |
|---|---|---|---|
| 4,051,474 | 9/1977 | Mack et al. | 343/756 |
| 4,233,576 | 11/1980 | Pelchat | 333/21 A |
| 4,554,552 | 11/1985 | Alford et al. | 343/786 |
| 4,672,687 | 6/1987 | Horton et al. | 455/131 |
| 4,710,734 | 11/1987 | Sterns | 343/756 |
| 4,737,793 | 4/1988 | Munson et al. | 342/361 |
| 4,792,987 | 12/1988 | Tumeo | 455/319 |
| 5,068,668 | 11/1991 | Tsuda et al. | 333/21 A |

FOREIGN PATENT DOCUMENTS 3523876 9/1986 Germany .

OTHER PUBLICATIONS

Article "Antenna Systems for ESM Applications—A Land Mobile Example", by R. J. Chignell et al, IEEE Proceedings, vol. 132, No. 4, Jul. 1985, pp. 252–256.

*Primary Examiner*—Reinhard J. Eisenzopf
*Assistant Examiner*—Lisa Charouel
*Attorney, Agent, or Firm*—Ostrolenk, Faber, Gerb & Soffen

[57] ABSTRACT

A frequency converter for reception of satellite broadcasting, comprising first to fourth feeding lines, each being disposed perpendicularly to one another and vertically through the center of a patch on which a satellite signal with polarized wave components is electromagnetically focused, to allow vertically and horizontally polarized waves of the satellite signal to be excited thereat, first through fourth first-stage low noise amplifiers connected, respectively, to the first through fourth feeding lines, for blocking or transferring the vertically and horizontally polarized wave signals excited at the first through fourth feeding lines in response to a reception selection control, first and second phase shifters connected, respectively, to outputs of the first and second first-stage amplifiers, for shifting the vertically and horizontally polarized wave signals by a desired phase in response to the reception selection control, respectively, so that left and right circularly polarized waves can be generated, and a signal mixing circuit for mixing an output signal from the first phase shifter with an output signal from the fourth first-stage amplifier and an output signal from the second phase shifter with an output signal from the third First-stage amplifier, mixing the mixed signals again and second-stage amplifying the again-mixed signal.

6 Claims, 5 Drawing Sheets

AMPLIFYING AND PHASE SHIFTING VERTICAL AND HORIZONTAL POLARIZED SIGNALS FOR FREQUENCY CONVERTING SATELLITE BROADCAST RECEPTIONS

BACKGROUND OF THE INVENTION

1. Field of the Invention

The present invention relates in general to a frequency converter for reception of satellite broadcasting which is capable of receiving a satellite signal having polarized wave components with no use of a polarized wave converter, and more particularly to a frequency converter for reception of satellite broadcasting which is capable of receiving left and right circularly polarized waves of a satellite signal by phase-shifting vertically and horizontally polarized waves thereof.

2. Description of the Prior Art

FIG. 1A is a block diagram of a conventional frequency converter for reception of satellite broadcasting and FIG. 1B is a sectional view of a portion of a waveguide connected to a feed horn of a general satellite broadcasting receiver. As shown in these drawings, disposed at one side of a dielectric substrate 3 is a feed horn 4 through which incomes a satellite signal focused on an antenna (not shown) which is disposed in the front of the feed horn 4. The conventional frequency converter comprises a patch 1 which is disposed at the other side of the dielectric substrate 3, corresponding to the center of a diameter of the feed horn 4. Feeding lines 2 are disposed vertically to the center of the patch 1, respectively. The feeding lines 2 consist of vertical and horizontal feeding lines 2V and 2H disposed perpendicularly to each other. The vertical and horizontal feeding lines 2V and 2H are connected commonly to each other through first-stage low noise amplifiers Q1V and Q1H and a connection point thereof is connected to a second-stage low noise amplifier Q. The feeding lines 2 are inserted through a wall of a waveguide 5 into a space in which the patch 1 is formed, and arranged vertically to the center of the patch 1 and apart at a desired interval therefrom, respectively.

The operation of the conventional frequency converter with the above-mentioned construction will hereinafter be described.

The satellite signal with polarized wave components which is focused on the antenna and incomes through the feed horn 4 is transferred through a dielectric material of the dielectric substrate 3 to the patch 1 of conductor pattern, thereby causing the satellite signal to be electromagnetically formed at the conductor patch 1.

The satellite signal electromagnetically formed at the conductor patch 1 is electromagnetically coupled to the vertical and horizontal feeding lines 2V and 2H, so that a vertically polarized wave of the satellite signal and a horizontally polarized wave of the satellite signal are excited at the vertical and horizontal feeding lines 2V and 2H, respectively.

One of the vertically and horizontally polarized wave signals excited at the vertical and horizontal feeding lines 2V and 2H is selected by turning-on/off of the first-stage low noise amplifiers Q1V and Q1H and applied to the second-stage low noise amplifier Q, which amplifies the selected signal and outputs the amplified signal to a satellite broadcasting receiving circuit.

Herein, the first-stage low noise amplifiers Q1V and Q1H and the second-stage low noise amplifier Q may typically be transistors for low noise amplification. One of the vertically and horizontally polarized wave signals is selected according to whether a turning-on bias is applied to any one of the first-stage low noise amplifiers Q1V and Q1H.

That is, for reception of the vertically polarized wave signal, the first-stage low noise amplifier Q1V connected to the vertical feeding line 2V is turned on, while the first-stage low noise amplifier Q1H connected to the horizontal feeding line 2H is turned off. As a result, the vertically polarized wave signal excited at the vertical feeding line 2V is first-stage amplified by the first-stage low noise amplifier Q1V and then second-stage amplified by the second-stage low noise amplifier Q.

On the other hand, for reception of the horizontally polarized wave signal, the first-stage low noise amplifier Q1H connected to the horizontal feeding line 2H is turned on, while the first-stage low noise amplifier Q1V connected to the vertical feeding line 2V is turned off. As a result, the horizontally polarized wave signal excited at the horizontal feeding line 2H is first-stage amplified by the first-stage low noise amplifier Q1H and then second-stage amplified by the second-stage low noise amplifier Q.

However, the conventional frequency converter for reception of satellite broadcasting is desirable in that it can receive the vertically and horizontally polarized wave signals, but has a disadvantage of being incapable of receiving left and right circularly polarized waves of the satellite signal without a polarized wave converter for converting the left and right circularly polarized waves into the linearly polarized waves or the vertically and horizontally polarized waves. The polarized wave converter for converting the left and right circularly polarized waves into the linearly polarized waves is generally disposed in the feed horn and may typically be of a ferrite magnetic material or a dielectric slab. The polarized wave converter of the ferrite magnetic material is desirable in that it is convenient to use since it can electrically perform the selection for the left and right circularly polarized waves, but has a disadvantage in that it is high in price. Also, the polarized wave converter of the dielectric slab is desirable in that it is low in price, but has a disadvantage in that it is inconvenient to use since a position of the slab is manually altered. Moreover, since the reception of the linearly polarized waves is impossible in the reception of the left and right circularly polarized waves, the dielectric slab must be removed in the reception of the linearly polarized waves. This causes an additional inconvenience.

SUMMARY OF THE INVENTION

Therefore, the present invention has been made in view of the above problems, and it is an object of the present invention to provide a frequency converter for reception of satellite broadcasting which is capable of receiving left and right circularly polarized waves of a satellite signal as well as vertically and horizontally polarized waves thereof with no use of a polarized wave converter, and is convenient to use.

In accordance with the present invention, the above object can be accomplished by a provision of a frequency converter for reception of satellite broadcasting, comprising: first through fourth feeding lines, each being disposed perpendicularly to one another and vertically to the center of a patch on which a satellite signal with polarized wave components is electromagnetically focused, to allow vertically and horizontally polarized waves of the satellite signal to be excited thereat; first through fourth first-stage amplifiers connected, respectively, to the first through fourth feeding lines, for blocking or transferring the vertically and horizontally polarized wave signals excited at the first through fourth feeding lines in response to a reception selection control; first and second phase shifting units connected, respectively, to outputs of the first and second first-stage amplifiers, for shifting the vertically and horizontally polarized wave signals by a desired phase in response to the reception selection control, respectively, so that left and right circularly polarized waves can be generated; and signal mixing unit for mixing an output signal from the first phase shifting unit with an output signal from the fourth first-stage amplifier and an output signal from the second phase shifting unit with an output signal from the third first-stage amplifier, mixing the mixed signals again and second-stage amplifying the mixed signal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1A:
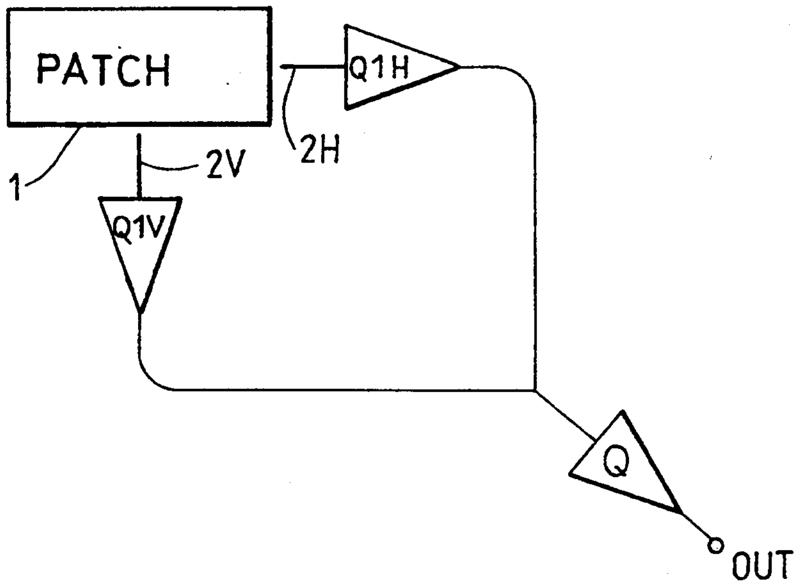
FIG. 1A PRIOR ART
FIG. 1A is a block diagram of a conventional frequency converter for reception of satellite broadcasting.
Figure 1B:
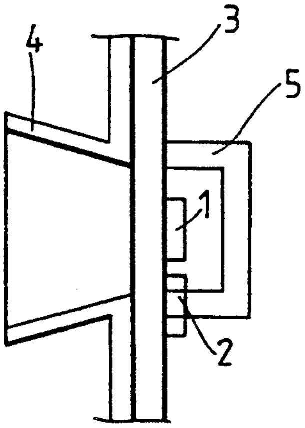
FIG. 1B PRIOR ART
FIG. 1B is a sectional view of a portion of a waveguide connected to a feed horn of a general satellite broadcasting receiver.
Figure 2:
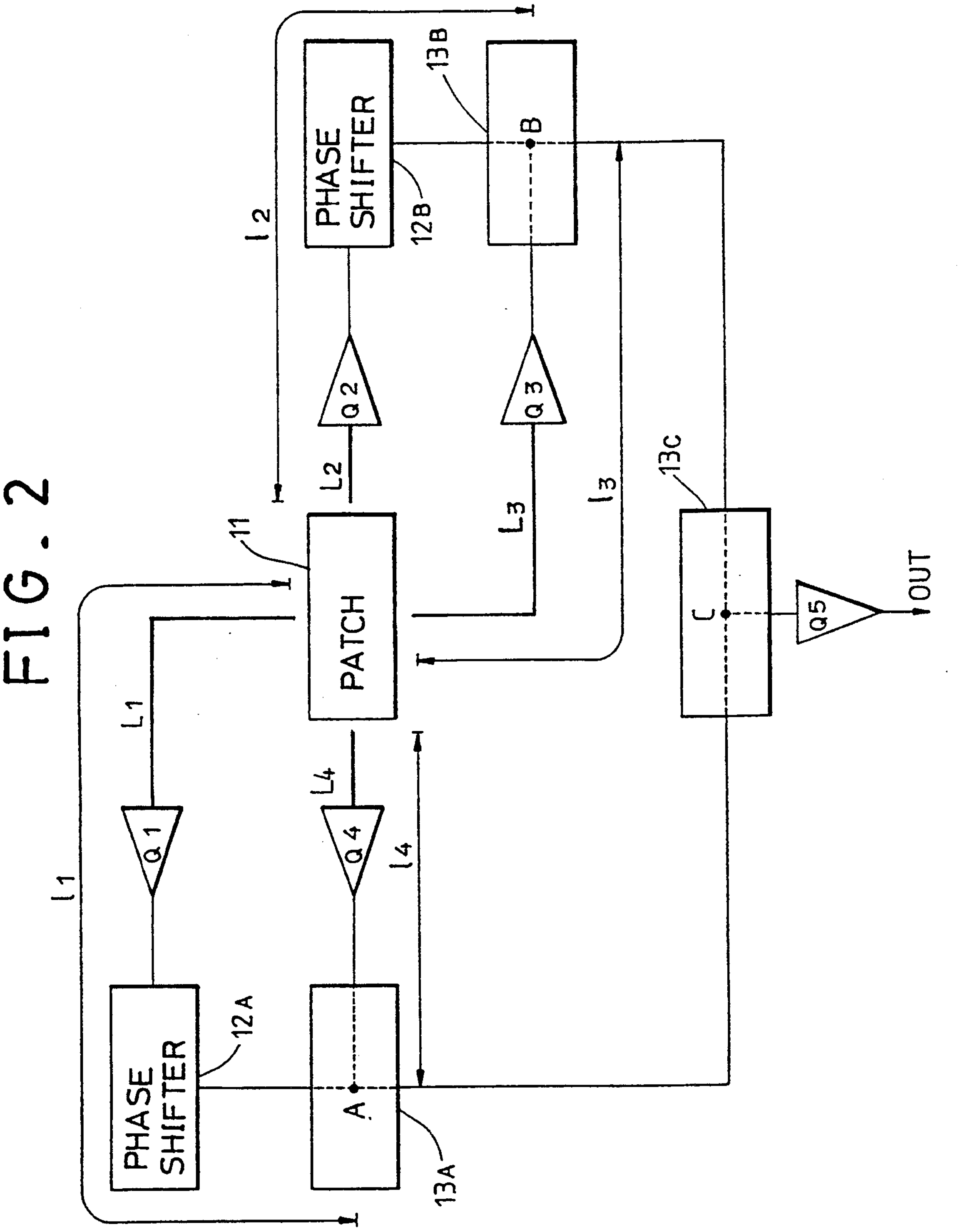
FIG. 2 is a block diagram of an embodiment of a frequency converter for reception of satellite broadcasting in accordance with the present invention.

Referring to FIG. 2, there is shown a block diagram of an embodiment of a frequency converter for reception of satellite broadcasting in accordance with the present invention. As shown in this Figure, the frequency converter comprises a square conductor patch 11 which is disposed at one side of a dielectric substrate (not shown), corresponding to the center of a diameter of a feed horn which is disposed at the other side of the dielectric substrate. The conductor patch 11 serves to electromagnetically focus a satellite signal with polarized wave components thereon. First through fourth feeding lines L1–L4 are disposed vertically to the center of the patch 11 and apart at a desired interval therefrom, respectively. The satellite signal electromagnetically formed at the conductor patch 11 is electromagnetically coupled to the first through fourth feeding lines L1–L4, so that vertically polarized waves of the satellite signal are excited at the first and third feeding lines L1 and L3 and horizontally polarized waves of the satellite signal are excited at the second and fourth feeding lines L2 and L4, respectively.

First-stage low noise amplifiers Q1–Q4 are connected to the first through fourth feeding lines L1–L4, respectively, at positions at which the first through fourth feeding lines L1–L4 have the same electrical length. The first-stage low noise amplifiers Q1–Q4 serve to block or transfer the vertically and horizontally polarized wave signals excited at the first through fourth feeding lines L1–L4, so that the vertically and horizontally polarized wave signals can selectively be received according to a user's selection. Herein, the electrical length is line length x propagation delay constant.

Phase shifters 12A and 12B are connected to outputs of the first-stage low noise amplifiers Q1 and Q2, respectively. Phase shifting of the phase shifters 12A and 12B is controlled such that the left and right circularly polarized waves can selectively be received according to a user's selection.

A signal mixing circuit is provided to mix, i.e. add, an output signal from the phase shifter 12A with an output signal from the first-stage low noise amplifier Q4 and an output signal from the phase shifter 12B with an output signal from the first-stage low noise amplifier Q3. Thereafter, the signals mixed as described above are mixed with one another and the resultant signal is amplified.

The signal mixing circuit includes a first-stage power coupler 13A connected commonly to outputs of the phase shifter 12A and the first-stage low noise amplifier Q4 for mixing the output signals therefrom, another first-stage power coupler 13B connected commonly to outputs of the phase shifter 12B and the first-stage low noise amplifier Q3 for mixing the output signals therefrom, a second-stage power coupler 13C connected commonly to outputs of the first-stage power couplers 13A and 13B for mixing the output signals therefrom, and a second-stage low noise amplifier Q5 connected to an output of the second-stage power coupler 13C for second-stage amplifying an output signal therefrom.

The operation of the frequency converter with the above-mentioned construction in accordance with the present invention will hereinafter be described.

There will first be described the principle of the present invention which is capable of selectively receiving the left and right circularly polarized waves and the vertically and horizontally polarized waves with no use of a polarized wave converter. Generally, in the case where electric field intensities are the same in X and Y directions, one of the left and right circularly polarized waves is generated according to whether the phase in the Y direction is 90° earlier or later than that in the X direction. Namely, if the phase in the Y direction is 90° earlier than that in the X direction, the left circularly polarized wave is generated. On the contrary, if the phase in the Y direction is 90° later than that in the X direction, the right circularly polarized wave is generated. The left and right circularly polarized waves are waves which rotate left and right with respect to the time.

Figure 3A:
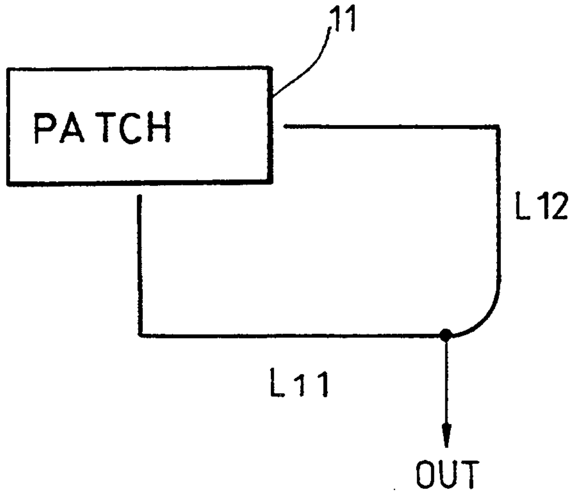
FIGS. 3A and 3B are views illustrating the principles of the present invention which generate left and right circularly polarized waves utilizing micro strip lines of a dual feeding manner, respectively.
Figure 3B:
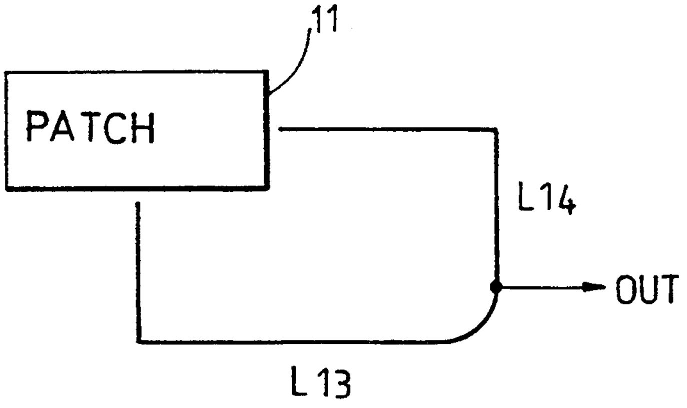

Referring to FIGS. 3A and 3B, there are illustrated the principles of the present invention which generate the left and right circularly polarized waves utilizing micro strip lines of a dual feeding manner, respectively. Herein, $L11=L14=L$, (desired length) and $L12=L13=L+\lambda/4$. There is present an electrical length difference of 90° between L and $L+\lambda/4$.

As shown in FIG. 3A, if the electrical length of the X direction feeding line L12 is λ/4 longer than that of the Y direction feeding line L11, generated at a connection point of the feeding lines L11 and L12 is the left circularly polarized wave in which the phase in the Y direction is 90° earlier than that in the X direction.

As shown in FIG. 3B, if the electrical length of the Y direction feeding line L13 is λ/4 longer than that of the X direction feeding line L14, generated at a connection point of the feeding lines L13 and L14 is the right circularly polarized wave in which the phase in the Y direction is 90° later than that in the X direction.

In accordance with the above-mentioned principle of the present invention, there is provided the frequency converter which is capable of receiving the left and right circularly polarized waves as well as the vertically and horizontally polarized waves with no use of the polarized wave converter.

Referring again to FIG. 2, a path consisting of the patch 11, the first feeding line L1, the first-stage low noise amplifier Q1, the phase shifter 12A and a connection point A of the first-stage power coupler 13A is referred to as a first loop 11, a path consisting of the patch 11, the fourth feeding line L4, the first-stage low noise amplifier Q4 and the connection point A of the first-stage power coupler 13A is referred to as a fourth loop 14, a path consisting of the patch 11, the second feeding line L2, the first-stage low noise amplifier Q2, the phase shifter 12B and a connection point B of the first-stage power coupler 13B is referred to as a second loop 12, and a path consisting of the patch 11, the third feeding line L3, the first-stage low noise amplifier Q3 and the connection point B of the first-stage power coupler 13B is referred to as a third loop 13.

For reception of the left and right circularly polarized waves, the phase shifters 12A and 12B are adjusted such that the first and fourth loops 11 and 14 and the second and third loops 12 and 13 have a difference of 90° with respect to a center frequency in the electrical length, respectively.

Namely, assuming that phase deviations of the phase shifters 12A and 12B are variable between 0° and 90°, the phase shifters 12A and 12B are adjusted such that the first and fourth loops 11 and 14 have the same certain electrical length between 0° and 90° and the second and third loops 12 and 13 have the same certain electrical length between 0° and 90°, so that the vertically and horizontally polarized waves can be received. On the other hand, for reception of the left and right circularly polarized waves, the phase shifters 12A and 12B are adjusted such that the first and fourth loops 11 and 14 and the second and third loops 12 and 13 have a difference of 90° with respect to the center frequency in the electrical length, respectively. This phase shifting is determined according to whether any one of the left and right circularly polarized waves is to be received.

In a similar manner, assuming that the phase deviations of the phase shifters 12A and 12B are variable between 0° and 180°, the phase shifters 12A and 12B are adjusted such that the first and fourth loops 11 and 14 have the same certain electrical length between 0° and 90° or 90° and 180° or have a difference of 90° in the electrical length and the second and third loops 12 and 13 have the same certain electrical length between 0° and 90° or 90° and 180° or have a difference of 90° in the electrical length.

The vertically polarized waves are excited at the first and third feeding lines L1 and L3 which are disposed vertically to the center of the square patch 11. For reception of the vertically polarized wave, the vertically polarized waves are passed through the first and third loops 11 and 13, respectively, beginning with the patch 11. Thereafter, the phase deviation of the phase shifter 12A is adjusted such that the vertically polarized wave through the first loop 11 and the vertically polarized wave through the third loop 13 have the same electrical length to the connection point C of the second-stage power coupler 13C. In a similar manner, the horizontally polarized waves are excited at the second and fourth feeding lines L2 and L4 which are disposed vertically to the center of the square patch 11. For reception of the horizontally polarized wave, the horizontally polarized waves are passed through the second and fourth loops 12 and 14, respectively, beginning with the patch 11. Thereafter, the phase deviation of the phase shifter 12B is adjusted such that the horizontally polarized wave through the second loop 12 and the horizontally polarized wave through the fourth loop 14 have the same electrical length to the connection point C of the second-stage power coupler 13C.

In the preferred embodiment of the present invention, the reason why the power couplers 13A, 13B and 13C are used at the connection points A, B and C at each of which the two paths meet with each other is because the signals are present simultaneously at the two paths. In other words, an isolation between the two paths must be increased to prevent the signal characteristic from being degraded due to an interference between the two paths. Also, the path between the connection points A and C and the path between the connection points B and C may have the same length, so as to avoid a degradation of the signal characteristic due to a phase difference.

Now, the operation of the frequency converter designed according to the principle of the present invention as mentioned above will be described in detail.

It is assumed that, when the phase deviations are not present in the phase shifters 12A and 12B, the first through fourth loops 11–14 have the same electrical length and the respective electrical lengths from the connection points A and B of the first-stage power couplers 13A and 13B to the connection point C of the second-stage power coupler 13C are the same.

The satellite signal with polarized wave components which is focused on an antenna (not shown) and incomes through the feed horn (not shown) and then electromagnetically formed at the conductor patch 11. The satellite signal electromagnetically formed at the conductor patch 11 is electromagnetically coupled to the first through fourth feeding lines L1–L4, so that the vertically polarized wave signals and the horizontally polarized wave signals are excited at the first and third feeding lines L1 and L3 and the second and fourth feeding lines L2 and L4, respectively. At this time, the first-stage low noise amplifiers Q1 and Q3 connected respectively to the first and third feeding lines L1 and L3 and the first-stage low noise amplifiers Q2 and Q4 connected respectively to the second and fourth feeding lines L2 and L4 are controlled, respectively, in pair, such that any one of the vertically and horizontally polarized wave signals can be received. Separate bias circuits 14 are used to control the turning-on/off of the first-stage amplifiers Q1–Q4 and the phase deviations of the phase shifters 12A and 12B, respectively.

For reception of the vertically polarized wave signal, the first-stage low noise amplifiers Q1 and Q3 connected respectively to the first and third feeding lines L1 and L3 are turned on and the first-stage low noise amplifiers Q2 and Q4 connected respectively to the second and fourth feeding lines L2 and L4 are turned off. Also, the phase shifter 12A in the first loop 11 is controlled such that no phase deviation is present therein.

Accordingly, the vertically polarized wave signals from the square patch 11 excited at the first and third feeding lines L1 and L3 are amplified by the first-stage low noise amplifiers Q1 and Q3. At this time, since the phase shifter 12A connected to the first-stage low noise amplifier Q1 has a phase difference of 0°, the two amplified signals from the first-stage low noise amplifiers Q1 and Q3 are added with no phase difference at the connection point C of the second-stage power coupler 13C, which applies the added signal to the second-stage low noise amplifier Q5.

For reception of the horizontally polarized wave signal, the first-stage low noise amplifiers Q1 and Q3 connected respectively to the first and third feeding lines L1 and L3 are turned off and the first-stage low noise amplifiers Q2 and Q4 connected respectively to the second and fourth feeding lines L2 and L4 are turned on, in the opposite manner to that for reception of the vertically polarized wave signal. Also, the phase shifter 12B connected to the first-stage low noise amplifier Q2 is controlled to have a phase difference of 0°.

Accordingly, the horizontally polarized wave signals from the square patch 11 excited at the second and fourth feeding lines L2 and L4 are amplified by the first-stage low noise amplifiers Q2 and Q4. At this time, since the phase shifter 12B connected to the first-stage low noise amplifier Q2 has the phase difference of 0°, the two amplified signals from the first-stage low noise amplifiers Q2 and Q4 are added with no phase difference at the connection point C of the second-stage power coupler 13C, which applies the added signal to the second-stage low noise amplifier Q5.

On the other hand, for reception of the right circularly polarized wave signal, the first-stage low noise amplifiers Q1 and Q4 are turned on and the first-stage low noise amplifiers Q2 and Q3 are turned off. Also, the phase shifter 12A is controlled to have a phase difference of 90° width respect to the center frequency. As a result, the vertically and horizontally polarized wave signals excited, respectively, at the first and fourth feeding lines L1 and L4 are amplified by the first-stage low noise amplifiers Q1 and Q4. The amplified signal from the first-stage low noise amplifier Q1 is 90° delayed in the phase shifter 12A and the 90° delayed signal is added with the amplified signal from the first-stage low noise amplifier Q4 at the connection point A of the power coupler 13A. Accordingly, since the Y direction electric field through the first loop 11 is 90° later than the X direction electric field through the fourth loop 14, the right circularly polarized wave can be received. The signal combined in this manner is applied to the second-stage low noise amplifier Q5.

Also, for reception of the left circularly polarized wave signal, the first-stage low noise amplifiers Q1 and Q4 are turned off and the first-stage low noise amplifiers Q2 and Q3 are turned on, in the opposite manner to that for reception of the right circularly polarized wave signal. Also, the phase shifter 12B is controlled to have a phase difference of 90° with respect to the center frequency. As a result, the horizontally and vertically polarized wave signals excited, respectively, at the second and third feeding lines L2 and L3 are amplified by the first-stage low noise amplifiers Q2 and Q3. The amplified signal from the first-stage low noise amplifier Q2 is 90° delayed in the phase shifter 12B and the 90° delayed signal is added with the amplified signal from the first-stage low noise amplifier Q3 at the connection point B of the power coupler 13B. Accordingly, since the Y direction electric field through the third loop 13 is 90° earlier than the X direction electric field through the second loop 12, the left circularly polarized wave can be received. The signal combined in this manner is applied to the second-stage low noise amplifier Q5.

Figure 4:
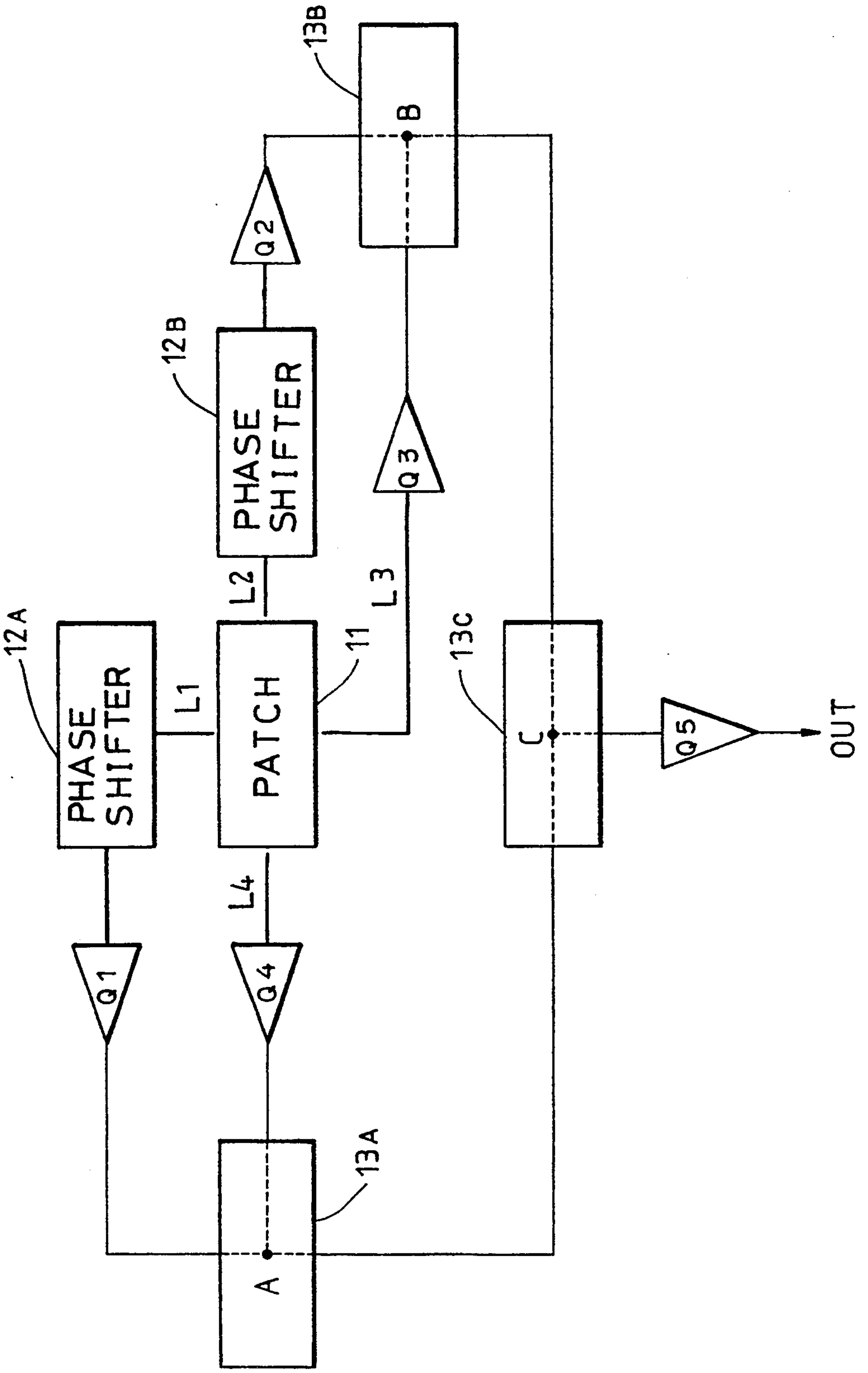
FIG. 4 is a block diagram of another embodiment of the frequency converter for reception of satellite broadcasting in accordance with the present invention.
Figure 5:
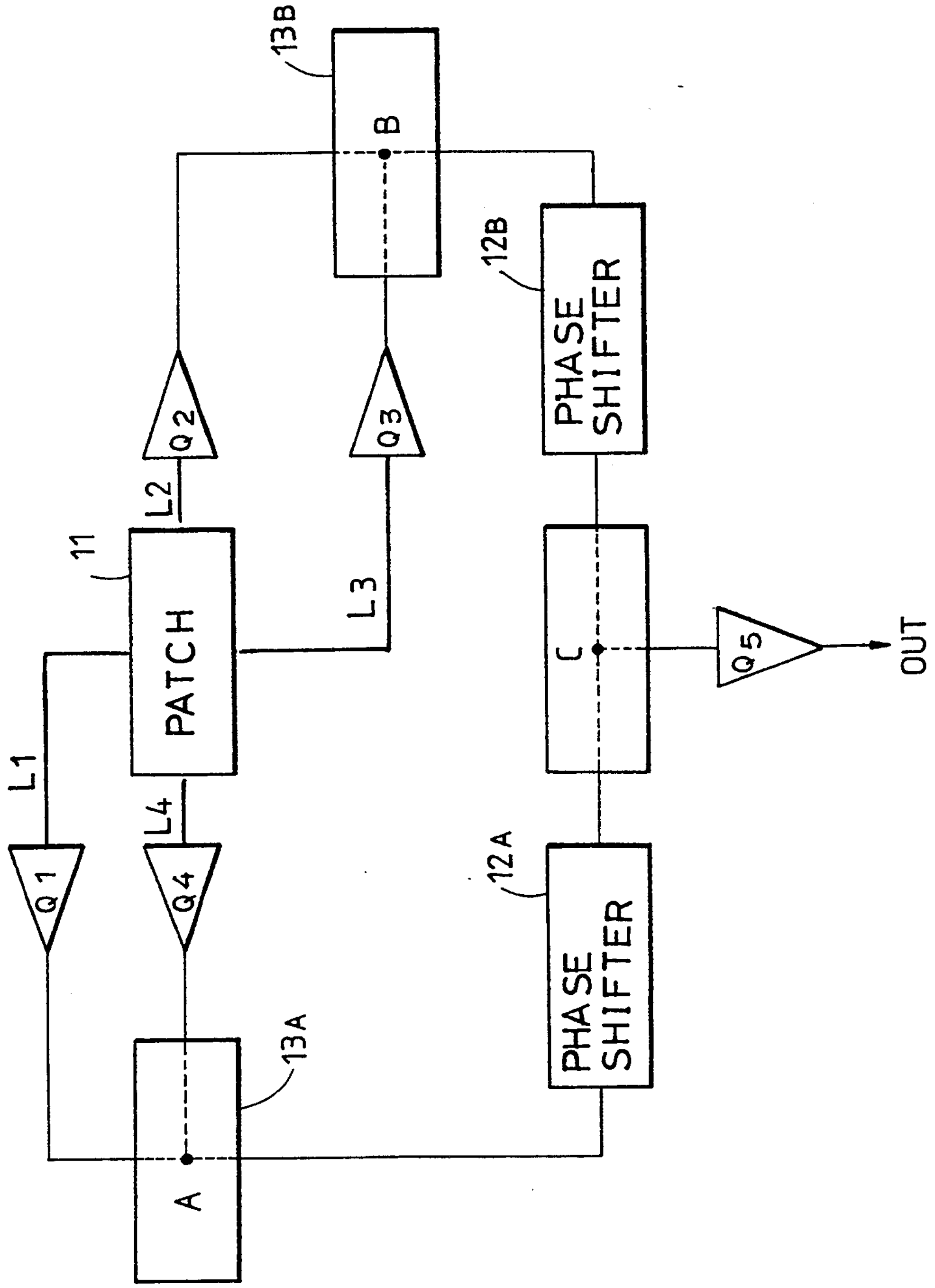
FIG. 5 is a block diagram of a still another embodiment of the frequency converter for reception of satellite broadcasting in accordance with the present invention.

Referring to FIGS. 4 and 5, there are shown different embodiments of the frequency converter for reception of satellite broadcasting in accordance with the present invention. As shown in FIG. 4, the phase shifters 12A and 12B may be connected between the patch 11 and the first-stage low noise amplifiers Q1 and Q2, respectively. Also as shown in FIG. 5, the phase shifters 12A and 12B may be connected between the first-stage power couplers 13A and 13B and the second-stage power coupler 13C, respectively.

As hereinbefore described, according to the present invention, there is provided the frequency converter which is capable of receiving the left and right circularly polarized waves as well as the vertically and horizontally polarized waves with no use of the polarized wave converter. Also, the frequency converter of the present invention is convenient to use and is low in price since it can electrically perform the selection for all the polarized waves without the use of the polarized wave converter of the ferrite magnetic material. Moreover, the use of the power couplers has the effect of increasing the isolation between the two paths so as to prevent the signal characteristic from being degraded due to the interference between the two paths.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A frequency converter for receiving polarized waves of a satellite signal, comprising:

first through fourth feeding means, each being disposed perpendicularly to each side of a patch on which the satellite signal with the polarized waves is electromagnetically focused, to allow the polarized waves of the satellite signal to be excited thereat;

first through fourth amplifying means connected, respectively, to said first through fourth feeding means, for blocking or transferring the polarized waves excited at said first through fourth feeding means in response to a reception selection control;

first and second phase shifting means connected, respectively, to outputs of the first and second amplifying means, for shifting vertical and horizontal waves of the polarized waves by a desired phase in response to the reception selection control, respectively, so that left and right circularly polarized waves can be generated; and first through third signal adding means, said first signal adding means for adding an output signal from said first phase shifting means to an output signal from said fourth amplifying means, the second signal adding means for adding an output signal from said second phase shifting means to an output signal from said third amplifying means, and said third adding means for adding the output signals from said first and second signal adding means.

2. A frequency converter as set forth in claim 1, wherein said first through third signal adding means comprise, respectively, first through third power couplers.

3. A frequency converter as set forth in claim 1, wherein said first phase shifting means is connected between said patch and said first amplifying means and said second phase shifting means is connected between said patch and said second amplifying means.

4. A frequency converter as set forth in claim 2, wherein an electrical path length between said first power coupler and said third power coupler is the same as that between said second power coupler and said third power coupler.

5. A frequency converter as set forth in claim 1, wherein said first through fourth feeding means have the same electrical path lengths.

6. A frequency converter for receiving polarized waves of a satellite signal, comprising:

first through fourth feeding means, each being disposed perpendicularly to each side of a patch on which the satellite signal with the polarized waves is electromagnetically focused, to allow the polarized waves of the satellite signal to be excited thereat;

first through fourth amplifying means connected, respectively, to said first through fourth feeding means, for blocking or transferring the polarized waves excited at said first through fourth feeding means in response to a reception selection control;

first through third signal adding means, said first signal adding means for adding an output signal from said first amplifying means to an output signal from said fourth amplifying means, the second signal adding means for adding an output signal from said second amplifying means to an output signal from said third amplifying means;

first and second phase shifting means connected, respectively, to outputs of the first and second signal adding means, for shifting vertical and horizontal waves of the polarized waves by a desired phase in response to the reception selection control, respectively so that left and right circularly polarized waves can be generated; and said third adding means for adding output signals from said first and second phase shifting means.

* * * * *